V. YORK.

OIL WELL DRILLING DRIVE.

APPLICATION FILED MAR. 22, 1920.

Reissued Apr. 4, 1922.

15,330.

INVENTOR:
VICTOR YORK,
By Graham + Kerr
ATTORNEYS.

UNITED STATES PATENT OFFICE.

VICTOR YORK, OF BREA, CALIFORNIA, ASSIGNOR OF ONE-HALF TO WALTER G. BLACK, OF WHITTIER, CALIFORNIA.

OIL-WELL-DRILLING DRIVE.

15,330. Specification of Reissued Letters Patent. Reissued Apr. 4, 1922.

Original No. 1,297,289, dated March 11, 1919, Serial No. 161,363, filed April 11, 1917. Application for reissue filed March 22, 1920. Serial No. 367,899.

*To all whom it may concern:*

Be it known that I, VICTOR YORK, a citizen of the United States, residing at Brea, in the county of Orange and State of California, have invented a new and useful Improvement in Oil-Well-Drilling Drives, of which the following is a specification.

My invention relates to the art of drilling oil wells, and more particularly to the art of drilling oil wells by the so-called rotary system. In this system a string of pipe is rotated by a rotary table, this string of pipe carrying a suitable bit at its lower end, by means of which the well is produced. In the present method of drilling wells the rotary table is mounted in suitable bearings located at or near the center of the derrick, this table being provided with a bevel gear which is driven from a bevel pinion carried on a short shaft. This shaft is driven through a chain from what is commonly called the draw works. This chain drive is a constant source of trouble, expense, and danger, as the breaking of the chain under tension results in a sudden whipping over of the broken ends which is extremely dangerous to the men in the derrick.

The method of driving now practised throughout the oil fields of the world where rotary drive is used is well illustrated and described in so far as the chain drive is concerned in Letters Patent of the United States 1,095,157, patented April 28, 1914, to Thomas J. Griffin. In this patent, the rotary table 1 is driven through a chain 7. This chain is in turn driven from a sprocket 16 which in practice is somewhat higher than a man's head. The chain 7 is a source of great danger and expense. It wears rapidly and breaks often and when it breaks, it has a great tendency to whip over and strike any man who may be in line with it. It also effectually blocks off one side of the derrick above the surface of the rotary table preventing the men from passing through upon that side in case of breakage in the derrick above. It also hinders operations as it prevents the men from passing freely around the pipe to manipulate tongs or do other necessary work in the derrick.

The principal object of my invention is to provide means for driving a rotary table without the use of chains. Further objects and advantages will be made evident hereinafter.

In the drawings, which are for illustrative purposes only:

Figure 1:
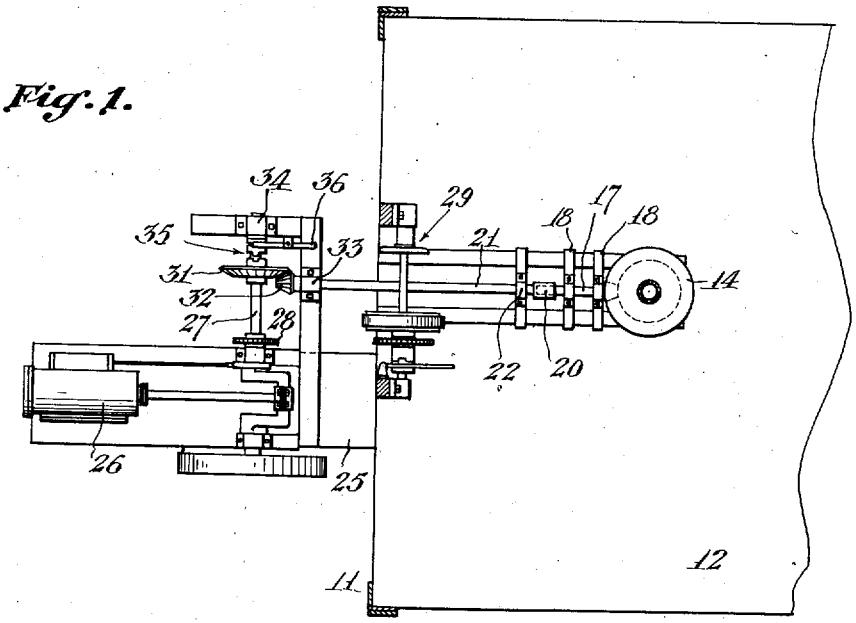
Fig. 1 is a plan view of a derrick equipped with my invention, a portion of the draw works being omitted for the sake of clearness.
Figure 2:
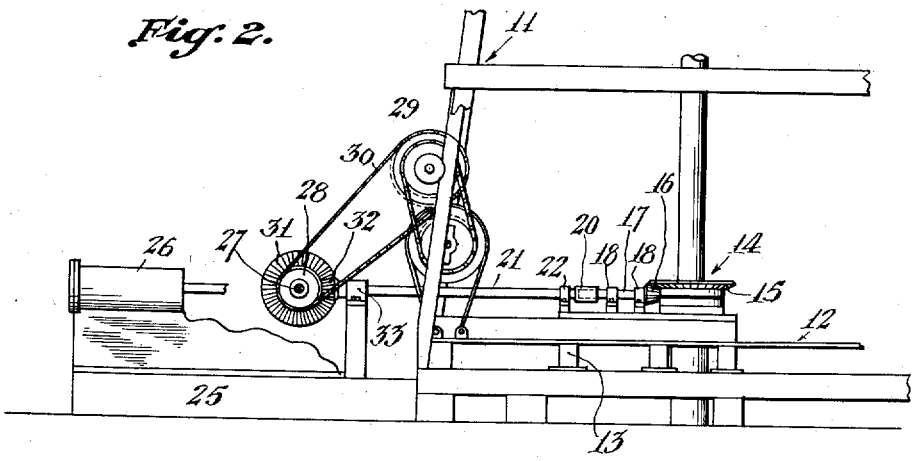
Fig. 2 is a side elevation of the apparatus shown in Fig. 1, a portion of the engine being broken away for the sake of clearness.
Figure 3:
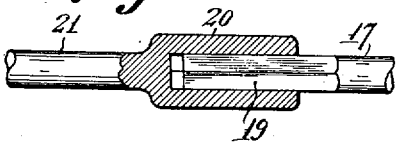
Fig. 3 is a sectional view of a portion of the invention.

In the form of my invention shown in these drawings, a derrick 11 is illustrated, this derrick having a floor 12, supported on suitable sills 13. Supported in suitable bearings at or near the center of the derrick is a standard rotary table 14, this table being provided with a driven bevel gear 15. Meshing with the gear 15 is a driving bevel pinion 16, this pinion being mounted on a short shaft 17, turning in suitable bearings 18. The end of the shaft 17 is provided with a square portion 19 which fits inside an extension 20 on a drive shaft 21. Drive shaft 21 is mounted in a bearing 22 located close to the extension 20.

Mounted on an engine block 25 is an engine 26, this engine having an engine shaft 27 on which is fixed a sprocket 28. The sprocket 28 drives the standard draw works 29 through a chain 30, the driving sprocket for the table 14 being however, omitted from the standard draw works 29.

Turning freely on the shaft 27 is a driving bevel gear 31, this gear meshing with a driven bevel pinion 32 which is mounted on the extreme end of the drive shaft 21. The drive shaft 21 is mounted in an outboard bearing 33. The outer end of the engine shaft 27 is mounted in outboard engine bearing 34. Located between the gear 31 and the bearing 34 is a jaw clutch 35, which is operated by levers 36.

The method of operation of the invention is as follows:

The engine 26, which may be gas or steam or otherwise driven, being in operation, the draw works 29 are operated through the chain 30, and the ordinary methods of handling pipe, etc., may be carried on in accordance with the present method. When it is desired to turn the table 14, the clutch 35 is thrown in gear so that the driving gear 31 operates the drive shaft 21 through the driven pinion 32. The power from the shaft 21 is transmitted to the shaft 17 through the extension 20 and the squared end 19 of the shaft 17. The shaft 17 drives the table 14 through the pinion 16 and the gear 15.

I claim as my invention:

1. In an oil well drilling drive, the combination of: a rotary table; a driven bevel gear attached to said table; a driving bevel pinion meshing with said driven bevel gear; a short shaft on which said driving bevel pinion is mounted; a supporting structure for said rotary table; two bearings carried on said support a short distance from each other and in which said short shaft turns; a drive shaft; means for loosely coupling said drive shaft to said short shaft; and means for driving said drive shaft.

2. In an oil well drilling drive, the combination of: a rotary table; a driven bevel gear attached to said table; a driving bevel pinion meshing with said driven bevel gear; a short shaft on which said driving bevel pinion is mounted; a supporting structure for said rotary table; two bearings carried on said support a short distance from each other and in which said short shaft turns; a drive shaft; a sleeve formed on one of said shafts; a member formed on the other of said shafts loosely coupling to said sleeve; and means for driving said drive shaft.

Los Angeles, Calif., Feb. 19, 1920.

VICTOR YORK.